United States Patent
Lai et al.

(10) Patent No.: US 10,415,358 B2
(45) Date of Patent: Sep. 17, 2019

(54) CONDITIONING A SUBTERRANEAN FORMATION

(71) Applicant: Saudi Arabian Oil Company, Dhahran (SA)

(72) Inventors: Bitao Lai, Katy, TX (US); Feng Liang, Cypress, TX (US); Leiming Li, Sugarland, TX (US); Jilin Zhang, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 15/435,466

(22) Filed: Feb. 17, 2017

(65) Prior Publication Data

US 2018/0238154 A1 Aug. 23, 2018

(51) Int. Cl.
| | |
|---|---|
| *E21B 43/26* | (2006.01) |
| *E21B 43/267* | (2006.01) |
| *C09K 8/62* | (2006.01) |
| *C09K 8/66* | (2006.01) |
| *C09K 8/80* | (2006.01) |

(52) U.S. Cl.
CPC ............... *E21B 43/26* (2013.01); *C09K 8/62* (2013.01); *C09K 8/665* (2013.01); *C09K 8/80* (2013.01); *E21B 43/267* (2013.01)

(58) Field of Classification Search
CPC .. C09K 8/62; C09K 8/665; C09K 8/80; E21B 43/26; E21B 43/267
See application file for complete search history.

(56) References Cited

U.S. PATENT DOCUMENTS

| | | | | | |
|---|---|---|---|---|---|
| 2,801,698 | A | * | 8/1957 | Bond ....................... | C09K 8/60 166/281 |
| 4,665,982 | A | * | 5/1987 | Brown ..................... | C09K 8/64 166/177.5 |
| 4,665,990 | A | * | 5/1987 | Perlman ................... | C09K 8/72 166/307 |
| 8,584,755 | B2 | * | 11/2013 | Willberg ................. | C09K 8/706 166/280.1 |
| 10,047,281 | B2 | * | 8/2018 | Nguyen ................. | E21B 43/267 |

(Continued)

FOREIGN PATENT DOCUMENTS

WO 2016163983 10/2016

OTHER PUBLICATIONS

Pablo Forni et al.; "Conditioning Pre-existing Old Vertical Wells to Stimulate and Test Vaca Muerta Shale Productivity through the Application of Pinpoint Completion Techniques", Society of Petroleum Engineers, SPE-172724-MS, Mar. 2015, 28 pages.

(Continued)

*Primary Examiner* — James G Sayre
(74) *Attorney, Agent, or Firm* — Fish & Richardson P.C.

(57) ABSTRACT

Techniques for hydraulically fracturing a geologic formation include circulating a proppant-free hydraulic fracturing liquid into a wellbore that is formed from a terranean surface into a geologic formation within a subterranean zone that is adjacent the wellbore; fluidly contacting the geologic formation with the proppant-free hydraulic fracturing liquid for a specified duration of time; and subsequent to the specified duration of time, circulating a hydraulic fracturing liquid that includes proppant into the wellbore to fracture the geologic formation.

20 Claims, 11 Drawing Sheets

(56) References Cited

U.S. PATENT DOCUMENTS

| | | | | |
|---|---|---|---|---|
| 2005/0016732 A1* | 1/2005 | Brannon | ............... | C09K 8/64 |
| | | | | 166/308.1 |
| 2009/0095469 A1 | 4/2009 | Dozier | | |
| 2009/0277634 A1* | 11/2009 | Case | ................. | E21B 21/062 |
| | | | | 166/275 |
| 2011/0083849 A1* | 4/2011 | Medvedev | ............ | C09K 8/665 |
| | | | | 166/280.1 |
| 2015/0083420 A1* | 3/2015 | Gupta | ............... | E21B 43/267 |
| | | | | 166/280.2 |

OTHER PUBLICATIONS

Lai et al.; "Experimental Investigation on Brazilian Tensile Strength of Organic-rich Gas Shale", Society of Petroleum Engineers, SPE-177644-MS, Nov. 2015, 24 pages.

George Waters, "Frac Fluids on Organic Shales: What We Know, What We Don't, and What Can We Do About It," SPE Asia Pacific Hydraulic Fracturing Conference, Aug. 24-26, 2016, Beijing, China, 29 pages.

E. Yaich et al., "A Case Study: The Impact of Soaking on Well Performance in the Marcellus," URTeC: 2154766, Jul. 2015, 1 page (Abstract and first page provided).

International Search Report and Written Opinion in International Application No. PCT?US2018/016846 dated Apr. 5, 2018, 16 pages.

\* cited by examiner

| Samples | Confining pressure (psi) | Before | | After | |
|---|---|---|---|---|---|
| | | Porosity (%) | Kair (md) | Porosity (%) | Kair (md) |
| | 500 | 9.02 | 0.016 | 10.66 | 0.363 |
| EF 162 | 1000 | 8.62 | 0.012 | 10.28 | 0.276 |
| | 2000 | 4.91 | 0.01 | 9.88 | 0.21 |
| | 500 | 8.38 | 0.195 | 11.11 | 2.306 |
| EF 163 | 1000 | 9.47 | 0.159 | 10.71 | 1.48 |
| | 2000 | 9.25 | 0.122 | 10.58 | 0.731 |
| | 500 | 9.97 | 0.024 | 11.83 | 0.923 |
| EF 164 | 1000 | 9.68 | 0.02 | 11.43 | 0.773 |
| | 2000 | 9.81 | 0.019 | 11.29 | 0.502 |

FIG. 7

CONDITIONING A SUBTERRANEAN FORMATION

TECHNICAL FIELD

The present disclosure relates to apparatus, systems, and methods for conditioning a subterranean formation.

BACKGROUND

Hydraulic fracturing of a rock formation includes the circulation of high pressure liquids into a wellbore, and into fluid contact with a subterranean zone, in order to fracture the rock in the zone. In some cases, increased or enhanced production of hydrocarbons from the subterranean zone can occur due to the fracture of the rock, which creates fluid pathways for the hydrocarbons to flow into the wellbore. A pressure at which a hydraulic fracturing liquid must be circulated to fracture the rock depends, for example, on the mechanical properties of the rock in the subterranean zone.

SUMMARY

In an example implementation, a method for hydraulically fracturing a geologic formation includes circulating a proppant-free hydraulic fracturing liquid into a wellbore that is formed from a terranean surface into a geologic formation within a subterranean zone that is adjacent the wellbore; fluidly contacting the geologic formation with the proppant-free hydraulic fracturing liquid for a specified duration of time; and subsequent to the specified duration of time, circulating a hydraulic fracturing liquid that includes proppant into the wellbore to fracture the geologic formation.

In a first aspect combinable with the example implementation, the specific duration of time is between about three hours and one month.

Another aspect combinable with any of the previous aspects further includes shutting in the wellbore during the specified duration of time.

In another aspect combinable with any of the previous aspects, the mechanical strength includes a tensile strength of the portion of the geologic formation.

In another aspect combinable with any of the previous aspects, circulating the proppant-free hydraulic fracturing liquid into the wellbore includes, prior to the specified duration of time, circulating, in a first stage, a first portion of the proppant-free hydraulic fracturing liquid into the wellbore to a first portion of the geologic formation; and circulating, in a second stage, a second portion of the proppant-free hydraulic fracturing liquid into the wellbore to a second portion of the geologic formation that is different than the first portion.

In another aspect combinable with any of the previous aspects, wherein fluidly contacting the geologic formation with the proppant-free hydraulic fracturing liquid for the specified duration of time includes fluidly contacting the first and second portions of the geologic formation with the first and second portions of the proppant-free hydraulic fracturing liquid simultaneously for the specified duration of time.

In another aspect combinable with any of the previous aspects, circulating the proppant-free hydraulic fracturing liquid includes circulating a first portion of the proppant-free hydraulic fracturing liquid, and fluidly contacting the geologic formation with the proppant-free hydraulic fracturing liquid for the specified duration of time includes fluidly contacting a first portion of the geologic formation with the first portion of the proppant-free hydraulic fracturing liquid for a first specified duration of time.

Another aspect combinable with any of the previous aspects further includes subsequent to the first specified duration of time: circulating a first portion of the hydraulic fracturing liquid that includes proppant into the wellbore to fracture the first portion of the geologic formation; circulating a second portion of the proppant-free hydraulic fracturing liquid into the wellbore; and fluidly contacting a second portion of the geologic formation with the second portion of the proppant-free hydraulic fracturing liquid for a second specified duration of time.

Another aspect combinable with any of the previous aspects further includes subsequent to the second specified duration of time, circulating a second portion of the hydraulic fracturing liquid that includes proppant into the wellbore to fracture the second portion of the geologic formation.

In another aspect combinable with any of the previous aspects, circulating the hydraulic fracturing liquid that includes proppant into the wellbore to fracture the geologic formation includes circulating a secondary portion of the hydraulic fracturing liquid that includes proppant into the wellbore to further fracture the geologic formation.

Another aspect combinable with any of the previous aspects further includes prior to the specified duration of time, circulating a primary portion of the hydraulic fracturing liquid that includes proppant into the wellbore to initially fracture the geologic formation.

Another aspect combinable with any of the previous aspects further includes initiating one or more hydraulic fractures in the geologic formation with the proppant-free hydraulic fracturing liquid.

In another aspect combinable with any of the previous aspects, the proppant-free hydraulic fracturing liquid includes a slickwater hydraulic fracturing liquid.

Another aspect combinable with any of the previous aspects further includes reducing a mechanical strength of the geologic formation based at least in part on the fluid contact of the geologic formation with the proppant-free hydraulic fracturing liquid for the specified duration of time.

In another example implementation, a hydraulic fracturing system includes a hydraulic fracturing liquid circulation system that includes one or more valves and one or more pumps that are configured to fluidly couple to a source of a proppant-free hydraulic fracturing liquid and a source of a hydraulic fracturing liquid that includes proppant; a hydraulic fracturing liquid delivery system that includes at least one conduit that is configured to fluidly couple to the hydraulic fracturing liquid circulation system and a wellbore formed from a terranean surface to a subterranean zone that includes a geologic formation; and a control system communicably coupled to the hydraulic fracturing liquid circulation system and configured to perform operations including controlling the hydraulic fracturing liquid circulation system to circulate the proppant-free hydraulic fracturing liquid into the wellbore to fluidly contact the geologic formation, controlling the hydraulic fracturing liquid circulation system to maintain fluid contact of the geologic formation with the proppant-free hydraulic fracturing liquid for a specified duration of time, and subsequent to the specified duration of time, controlling the hydraulic fracturing liquid circulation system to circulate the hydraulic fracturing liquid that includes proppant into the wellbore to fracture the geologic formation.

In a first aspect combinable with the example implementation, the specific duration of time is between about three hours and one month.

In another aspect combinable with any of the previous aspects, controlling the hydraulic fracturing liquid circulation system to maintain fluid contact of the geologic formation with the proppant-free hydraulic fracturing liquid for the specified duration of time includes shutting in the wellbore during the specified duration of time.

In another aspect combinable with any of the previous aspects, the mechanical strength includes a tensile strength of the portion of the geologic formation.

In another aspect combinable with any of the previous aspects, controlling the hydraulic fracturing liquid circulation system to circulate the proppant-free hydraulic fracturing liquid into the wellbore includes, prior to the specified duration of time, controlling the hydraulic fracturing liquid circulation system to circulate, in a first stage, a first portion of the proppant-free hydraulic fracturing liquid into the wellbore to a first portion of the geologic formation; and controlling the hydraulic fracturing liquid circulation system to circulate, in a second stage, a second portion of the proppant-free hydraulic fracturing liquid into the wellbore to a second portion of the geologic formation that is different than the first portion.

In another aspect combinable with any of the previous aspects, controlling the hydraulic fracturing liquid circulation system to maintain fluid contact of the geologic formation with the proppant-free hydraulic fracturing liquid for the specified duration of time includes controlling the hydraulic fracturing liquid circulation system to maintain fluid contact of the first and second portions of the geologic formation with the first and second portions of the proppant-free hydraulic fracturing liquid simultaneously for the specified duration of time.

In another aspect combinable with any of the previous aspects, the proppant-free hydraulic fracturing liquid includes a first portion of the proppant-free hydraulic fracturing liquid, the specified duration of time includes a first specified duration of time, and the geologic formation includes a first portion of the geologic formation.

In another aspect combinable with any of the previous aspects, the control system is further configured to perform operations including subsequent to the first specified duration of time: controlling the hydraulic fracturing liquid circulation system to circulate a first portion of the hydraulic fracturing liquid that includes proppant into the wellbore to fracture a first portion of the geologic formation; controlling the hydraulic fracturing liquid circulation system to circulate a second portion of the proppant-free hydraulic fracturing liquid into the wellbore; and controlling the hydraulic fracturing liquid circulation system to maintain fluid contact of a second portion of the geologic formation with the second portion of the proppant-free hydraulic fracturing liquid for a second specified duration of time; and subsequent to the second specified duration of time, controlling the hydraulic fracturing liquid circulation system to circulate a second portion of the hydraulic fracturing liquid that includes proppant into the wellbore to fracture the second portion of the geologic formation.

In another aspect combinable with any of the previous aspects, a mechanical strength of the geologic formation is reduced based at least in part on the fluid contact of the geologic formation with the proppant-free hydraulic fracturing liquid for the specified duration of time.

In another example implementation, a method includes (i) circulating a pad liquid into a wellbore to contact a rock formation in a subterranean zone adjacent the wellbore; (ii) conditioning the rock formation with the pad fluid for a time duration sufficient to reduce a mechanical property of the rock formation a specified amount or percentage; and (iii) circulating a hydraulic fracturing liquid that includes proppant into the wellbore to fracture the rock formation.

In a first aspect combinable with the example implementation, the mechanical property includes at least one of tensile strength, permeability, or porosity.

In another aspect combinable with any of the previous aspects, the pad liquid includes a slickwater liquid.

In another aspect combinable with any of the previous aspects, the slickwater includes a water- or brine-based acrylamide methyl propane sulfonate (AMPS) polyacrylamide liquid.

In another aspect combinable with any of the previous aspects, step (iii) proceeds subsequent to the time duration.

Another aspect combinable with any of the previous aspects further includes sequentially repeating steps (i) through (iii) for each stage of a multi-stage fracturing operation.

Another aspect combinable with any of the previous aspects further includes (iv) sequentially repeating steps (i) and (ii) for each stage of a multi-stage fracturing operation; and (v) subsequent to step (iv), repeating step (iii) for each stage of the multi-stage fracturing operation.

In another example implementation, a method includes (i) circulating a pad liquid into a wellbore to contact a rock formation in a subterranean zone adjacent the wellbore; (ii) circulating a hydraulic fracturing liquid that includes proppant into the wellbore to fracture the rock formation; (iii) shutting in the wellbore for a time duration sufficient to reduce a mechanical property of the rock formation a specified amount or percentage based on contact between the rock formation and at least one of the pad liquid or the hydraulic fracturing liquid; and (iv) subsequent to the time duration, circulating the hydraulic fracturing liquid that includes proppant into the wellbore to further fracture the rock formation.

A first aspect combinable with the example implementation further includes sequentially repeating steps (i) through (iv) for each stage of a multi-stage fracturing operation.

Implementations according to the present disclosure may include one or more of the following features. For example a hydraulic fracturing process according to the present disclosure may be more economic and cost effective in horizontal wells with multiple wells in a pad relative to conventional hydraulic fracturing processes. A hydraulic fracturing process according to the present disclosure may weaken mechanical properties of a rock formation by a conditioning step with hydraulic fracturing liquid or liquids. A hydraulic fracturing process according to the present disclosure may decrease tensile strength (or other strength characteristics) of a rock formation that has been conditioned. A hydraulic fracturing process according to the present disclosure may generate a more complex fracturing network, which may or may not be propped open by proppant, and if propped open, the network may increase the connections and surface area between the hydraulic fractures and rock matrix. A hydraulic fracturing process according to the present disclosure may increase matrix permeability of a rock formation.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 7 shows a table that includes porosity and permeability data of at least one core sample of the geologic formation as part of the experimental process that included conditioning the core samples according to the present disclosure.

DETAILED DESCRIPTION

The present disclosure describes hydraulic fracturing systems and methods in which a conditioning step is added to the hydraulic fracturing process, e.g., after one or more hydraulic fracturing liquids are circulated to initiate hydraulic fractures in the specified rock formation. The reservoir rocks are conditioned with, e.g., a proppant-free liquid for a specified amount of time. Next, one or more hydraulic fracturing liquids that include proppant is circulated to further fracture the geologic formation and place the proppant into the fractures. By introducing this conditioning time, the rock mechanical strength is weakened, the matrix permeability is significantly increased, and more complexed fractures may be generated relative to conventional hydraulic fracturing processes.

Figure 1:
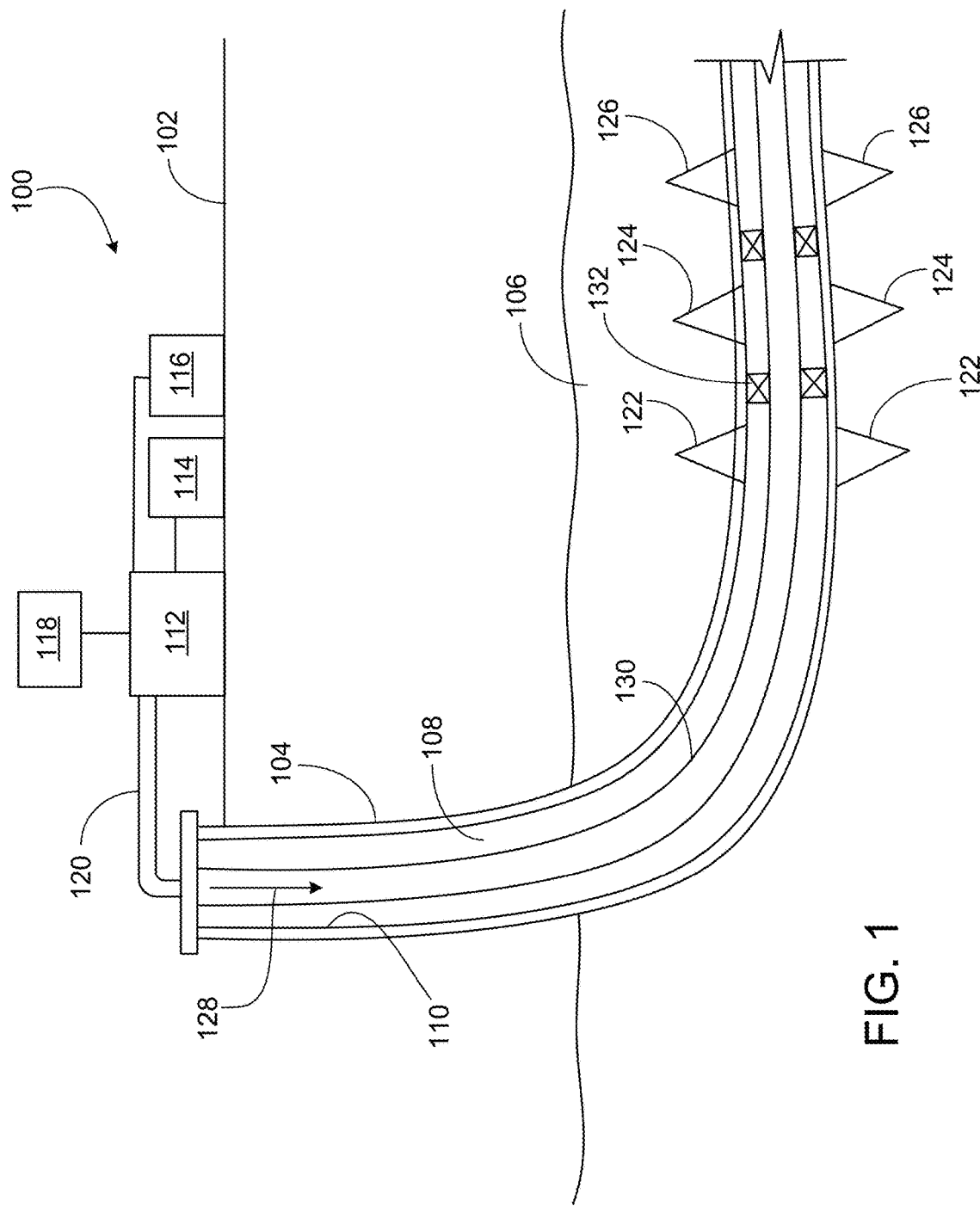
FIG. 1 is a schematic illustration of an example implementation of a hydraulic fracturing system according to the present disclosure.

FIG. 1 is a schematic illustration of an example implementation of a hydraulic fracturing system 100. Generally, system 100 may be operated to apply a fracture treatment to a subterranean formation 106 (e.g., rock formation, geologic formation) from a wellbore 104 that extends from a terranean surface 102 to the subterranean formation 106. Fracture treatments can be used, for example, to form or propagate fractures in a rock layer of the subterranean formation 106 by injecting pressurized fluid. The fracture treatment enhance or otherwise influence production of petroleum, natural gas, coal seam gas, or other types of reservoir resources.

The wellbore 104 shown in FIG. 1 includes vertical and horizontal sections, as well as a curved section that connects the vertical and horizontal portions. Generally, and in alternative implementations, the wellbore 104 can include horizontal, vertical (e.g., only vertical), slant, curved, and other types of wellbore geometries and orientations, and the fracture treatment can generally be applied to any portion of a subterranean formation 106. The wellbore 104, in this example, includes a casing 110 that is cemented or otherwise secured to the wellbore wall to define a borehole 108 in the inner volume of the casing 110. In alternative implementations, the wellbore 104 can be uncased or include uncased sections. Perforations (not specifically labeled) can be formed in the casing 110 to allow fracturing fluids and/or other materials to flow into the borehole 108 and to the terranean surface 102. Perforations can be formed using shape charges, a perforating gun, and/or other tools. Although illustrated as generally vertical portions and generally horizontal portions, such parts of the wellbore 104 may deviate from exactly vertical and exactly horizontal (e.g., relative to the terranean surface 102) depending on the formation techniques of the wellbore 104, type of rock formation in the subterranean formation 106, and other factors. Generally, the present disclosure contemplates all conventional and novel techniques for forming the wellbore 104 from the surface 102 into the subterranean formation 106.

Although labeled as a terranean surface 102, this surface may be any appropriate surface on Earth (or other planet) from which drilling and completion equipment may be staged to recover hydrocarbons from a subterranean zone. For example, in some aspects, the surface 102 may represent a body of water, such as a sea, gulf, ocean, lake, or otherwise. In some aspects, all are part of a drilling and completion system, including hydraulic fracturing system 100, may be staged on the body of water or on a floor of the body of water (e.g., ocean or gulf floor). Thus, references to terranean surface 102 includes reference to bodies of water, terranean surfaces under bodies of water, as well as land locations.

Subterranean formation 106 includes one or more rock or geologic formations that bear hydrocarbons (e.g., oil, gas) or other fluids (e.g., water) to be produced to the terranean surface 102. For example, the rock or geologic formations can be shale, sandstone, or other type of rock, typically, that may be hydraulically fractured to initiate, increase, or enhance the production of such hydrocarbons.

The example hydraulic fracturing system 100 includes a hydraulic fracturing liquid circulation system 112 that is fluidly coupled to the borehole 108 through conduit 120 and also fluidly coupled to a first hydraulic fracturing liquid 114 and a second hydraulic fracturing liquid 116. In some aspects, there may be multiple first hydraulic fracturing liquids 114 and/or multiple second hydraulic fracturing liquids 116 (e.g., each liquid stored separately). In some aspects, each of the multiple liquids (whether 114 or 116) may be the same composition (e.g., each first hydraulic fracturing liquid 114 is the same or each second hydraulic fracturing liquid 116 is the same).

In some aspects, as shown, the hydraulic fracturing liquid circulation system 112 is fluidly coupled to the subterranean formation 106 (which could include a single formation, multiple formations or portions of a formation) through a working string 130 (e.g., a tubular string that may be lowered and raised through the borehole 109). Generally, the hydraulic fracturing liquid circulation system 112 can be deployed in any suitable environment, for example, via skid equipment, a marine vessel, sub-sea deployed equipment, or other types of equipment and include hoses, tubes, fluid tanks or reservoirs, pumps, valves, and/or other suitable structures and equipment arranged to circulate a hydraulic fracturing liquid 128 through the working string 130 and into the subterranean formation 106. The working string 130 is positioned to communicate the hydraulic fracturing liquid 128 into the wellbore 104 and can include coiled tubing, sectioned pipe, and/or other structures that communicate fluid through the wellbore 104. The working string 130 can also include flow control devices, bypass valves, ports, and or other tools or well devices that control the flow of fracturing fluid from the interior of the working string 130 into the subterranean formation 106.

In this example, a control system 118 is communicably coupled to the hydraulic fracturing liquid circulation system 112 (and may also be communicably coupled to one or more other components in the hydraulic fracturing system 100, such as flow control devices in the conduit 120, the working string 130, or other components). Generally, the control system 118, which may be electronic, electric, electromechanical, mechanical, pneumatic, or a combination thereof, may control (e.g., automatically without real-time human intervention, by a human operator, or a combination thereof) the hydraulic fracturing liquid circulation system 112 to deliver the hydraulic fracturing liquid 128 at specified flowrates, pressures, and time durations to the working string 130 and to the subterranean formation 106 to hydraulically fracture a geologic or rock formation. Control of the hydraulic fracturing liquid circulation system 112 may include, for example, opening, closing, and modulating one or more valves that fluidly couple the circulation system 112 to the first and second hydraulic fracturing liquid sources 114 and 116, as well as the conduit 120 and the working string 130. Control of the hydraulic fracturing liquid circulation system 112 may also include, for example, controlling one or more pump motor controllers (e.g., variable frequency drives) to circulate one or both of the first and second hydraulic fracturing liquid sources 114 and 116 into the working string 130 and to the subterranean formation 106.

Generally, the first hydraulic fracturing liquid 114 includes a pad or pre-pad liquid that does not include proppant. For example, in some examples, the first hydraulic fracturing liquid 114 (which may be mixed, generated, and stored at the wellsite or delivered to the wellsite) may include a slickwater liquid. For instance, the slickwater hydraulic fracturing liquid may consist of water mixed with a low concentration of a friction reducer to reduce a friction pressure in the working string 130 as the first hydraulic fracturing liquid 114 is circulated to the subterranean formation 106 by the hydraulic fracturing liquid circulation system 112. The friction reducer may be based on acrylamide polymers or copolymers. In some specific examples, the first hydraulic fracturing liquid 114 may include a water or brine-based Acrylamido Methyl Propane Sulfonate (AMPS)-polyacrylamide slickwater.

The second hydraulic fracturing liquid 116 includes a liquid that does include proppant (e.g., plastic-based or coated with resin or polymer or other softer materials to mitigate embedment issues). For example, in some examples, the second hydraulic fracturing liquid 116 (which may be mixed, generated, and stored at the wellsite or delivered to the wellsite) may also include a slickwater liquid, such as a slickwater that is seawater- or brine-based and includes proppant. Moreover, in some aspects, the second hydraulic fracturing liquid 116 may include two separate hydraulic fracturing liquids. For example, one of the second hydraulic fracturing liquid 116 may be a slickwater hydraulic fracturing liquid, while another of the second hydraulic fracturing liquid 116 may be a linear or crosslinked hydraulic fracturing liquid that also includes proppant. Thus, for the present disclosure, the difference between the one or more first hydraulic fracturing liquids 114 (e.g., pad and pre-pad liquids) and the one or more second hydraulic fracturing liquids 116 is that the one or more first hydraulic fracturing liquids 114 does not include proppant and the one or more second hydraulic fracturing liquids 116 does include proppant. Both, however, may be circulated by the hydraulic fracturing liquid circulation system 112 into the working string 130 as the hydraulic fracturing liquid 128 (e.g., based on a particular step being implemented in the hydraulic fracture job or operation).

As shown in FIG. 1, there may be multiple fracture zones (or stages) 122, 124, and 126 within the subterranean formation 106. In some aspects, as explained more fully herein, the first and second hydraulic fracturing liquids 114 and 116 may be circulated in a specified order, and at specified times within a hydraulic fracturing job (e.g., multi-stage) to fractures in the zones 122, 124, and 126. Although three fracture zones or stages or shown, more or fewer are also contemplated by the present disclosure. In some aspects, each zone 122, 124, and 126 may be fluidly isolated, e.g., with packers 132 or other zonal isolation devices or techniques. Such isolation may be implemented within the hydraulic fracturing process, e.g., after or prior to certain circulations of the first or second hydraulic fracturing liquids 114 or 116.

Figure 2A:
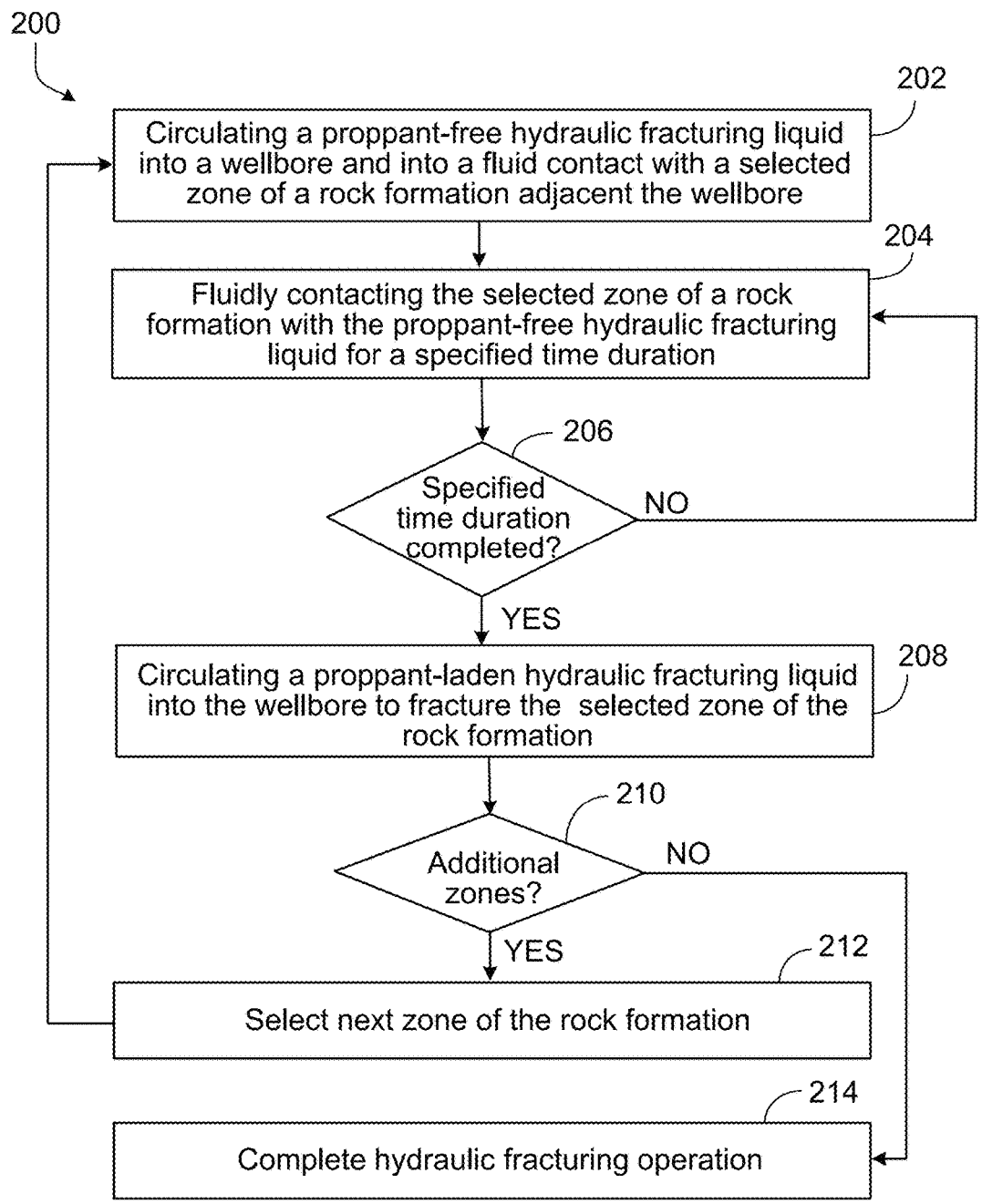
FIGS. 2A-2C are flowcharts that describe example methods for hydraulically fracturing a geologic formation that include conditioning a geologic formation according to the present disclosure.
Figure 2B:
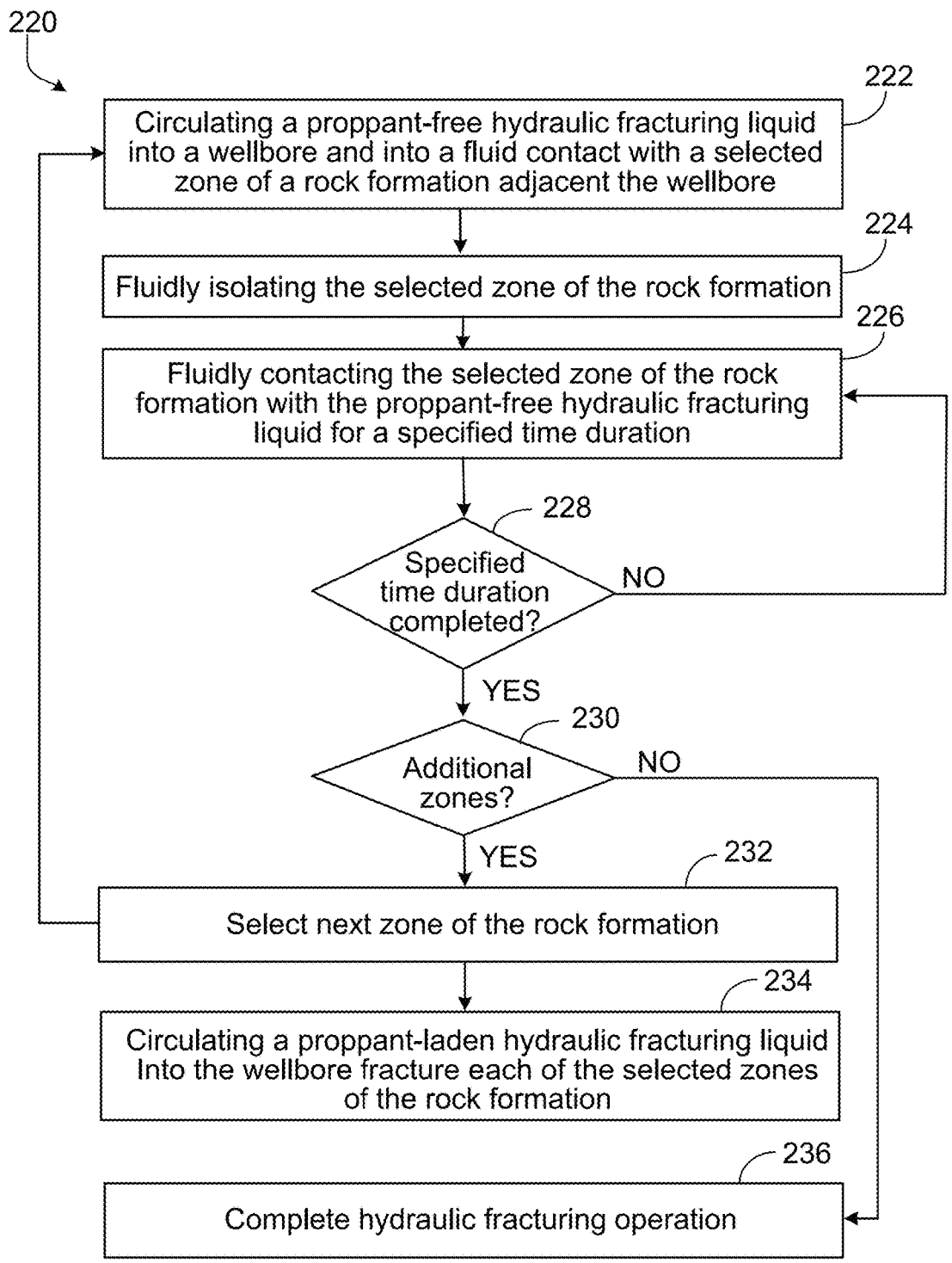
Figure 2C:
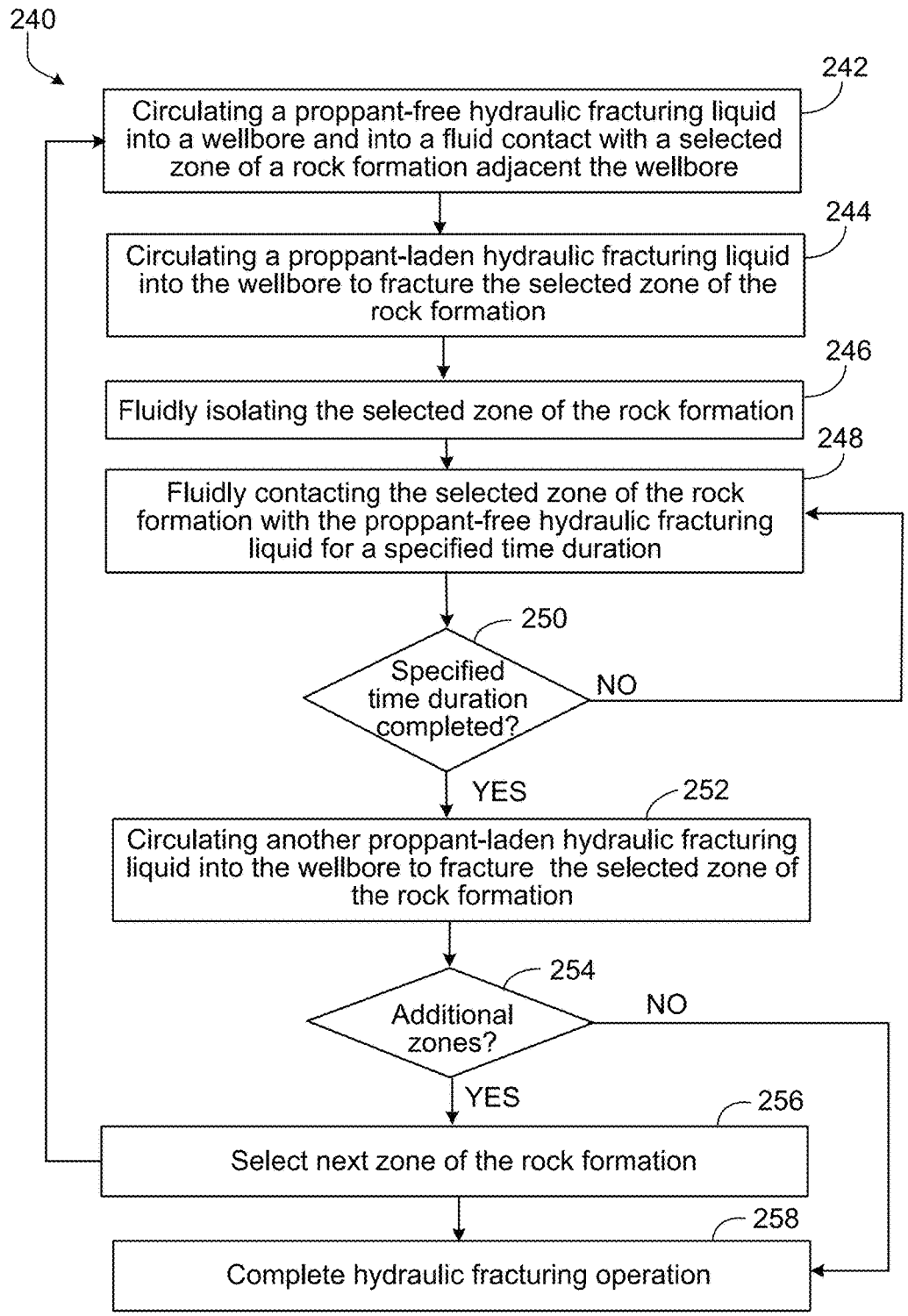

FIGS. 2A-2C are flowcharts that describe example methods for hydraulically fracturing a geologic formation that include conditioning a geologic formation. In some aspects, the example methods 200, 220, and 240 shown in FIGS. 2A-2C, respectively, may be performed with or by the hydraulic fracturing system 100 shown in FIG. 1, or another hydraulic fracturing system according to the present disclosure. Generally, the methods 200, 220, and 240 each implement a hydraulic fracturing process that may create longer and more complex fracturing system in rock formation, such as tight reservoirs, organic-rich shale reservoirs, or other reservoirs. For instance, each example method includes a conditioning time duration in which a hydraulic fracturing liquid remains in fluid contact with one or more zones or stages of a rock formation during a hydraulic fracturing process. In some aspects, the hydraulic fracturing liquid is a pre-pad or pad (e.g., proppant-free) liquid. In some aspects, the hydraulic fracturing liquid is a proppant-laden liquid. In some aspects, the fluid contact between the hydraulic fracturing liquid and the zone or zones of the rock formation for the conditioning time duration (e.g., hours, days, weeks, months) may significantly reduce a mechanical strength (e.g., tensile strength) of the rock formation as well as increase porosity and permeability of the rock formation.

Method 200 of FIG. 2A, for example, describes an example hydraulic fracturing process in which each zone of multiple zones of a rock formation in a subterranean zone may be conditioned with a proppant-free hydraulic fracturing liquid and then fractured (or further fractured) with a proppant-laden hydraulic fracturing liquid in sequence (e.g., each zone is conditioned and fractured prior to the process moving to the next zone). Method 200 may begin at step 202, which includes circulating a proppant-free hydraulic fracturing liquid into a wellbore and into fluid contact with a selected zone of a rock formation adjacent the wellbore. For example, the proppant-free hydraulic fracturing liquid may be, for instance, the first hydraulic fracturing liquid 114, and is circulated by the hydraulic fracturing liquid circulation system 112 into the working string 130. The proppant-free hydraulic fracturing liquid (e.g., a pad or pre-pad liquid) is circulated into a particular zone (e.g., zone 126) to contact the rock formation in the zone. In some aspects, the proppant-free hydraulic fracturing liquid may begin to initiate fractures in the rock formation in step 202.

Method 200 may continue at step 204, which includes fluidly contacting the selected zone of the rock formation with the proppant-free hydraulic fracturing liquid for a specified time duration. For example, in some aspects, the proppant-free hydraulic fracturing liquid may be isolated at the selected zone to condition, or soak, the rock formation in that zone for a specified time period (e.g., hours, days, weeks, months). In some aspects, the specified time duration may have been previously determined by testing of conditioning times (with that specific or similar proppant-free hydraulic fracturing liquid) or the particular rock formation, whether it be shale, sandstone, or otherwise. In some examples, the specified time duration is determined through testing of core samples of the rock formation to determine how much conditioning time is needed for a reduction of a particular amount or percentage of a mechanical strength (e.g., tensile strength) of the rock formation. In some examples, the specified time duration is determined through testing of core samples of the rock formation to determine how much conditioning time is needed for an increase of a particular amount or percentage of a permeability or porosity of the rock formation.

Method 200 may continue at step 206, which includes a determination of whether the specified time duration is completed. Once the specified time duration is completed, method 200 may continue to step 208. If the specified time duration is not completed, then the proppant-free hydraulic fracturing liquid continues to condition or fluidly contact the rock formation in the selected zone at step 204. In some aspects, the determination may be made by the control system 118.

Method 200 may continue at step 208, which includes circulating a proppant-laden hydraulic fracturing liquid into the wellbore to fracture the selected zone of the rock formation. For example, in some aspects, the proppant-laden hydraulic fracturing liquid is the second hydraulic fracturing liquid 116, which may be circulated through the working string 130 by the hydraulic fracturing liquid circulation system 112. The proppant-laden hydraulic fracturing liquid (e.g., a seawater- or brine-based slickwater with proppant) is circulated into the selected zone (e.g., zone 126) to contact the rock formation in the zone and more fully fracture the formation, leaving proppant in the formed fractures.

Method 200 may continue at step 210, which includes a determination of whether there are additional zones in the rock formation (e.g., in which steps 202-208 have not been completed). For example, in some aspects, the method 200 may complete steps 202-208 for zone 126 (e.g., while that zone is isolated from other zones). If there are additional zones (e.g., zones 122, 124) for which steps 202-208 have not been completed, then method 200 moves to step 212. If steps 202-208 have been completed for all zones of the subterranean formation, then method 200 may continue at step 214.

Method 200 may continue at step 212, which includes selecting a next zone of the rock formation. For example, upon a determination that there are additional zones (or an additional zone) of the subterranean formation for which steps 202-208 have not been completed, then an untreated zone (e.g., zone 122 or zone 124) is selected. Method 200 then repeats steps 202-208 for the newly selected zone.

Method 200 may continue at step 214, which includes completing the hydraulic fracturing operation. For example, once all of the zones of the subterranean formation have been treated (e.g., conditioned and hydraulically fractured) according to steps 202-212, then the hydraulic fracturing job may be completed.

Method 220 of FIG. 2B, for example, describes an example hydraulic fracturing process in which each zone of multiple zones of a rock formation in a subterranean zone may be conditioned with a proppant-free hydraulic fracturing liquid sequentially. Once all zones have been conditioned, then each zone may be fractured (or further fractured) with a proppant-laden hydraulic fracturing liquid in sequence (e.g., each zone is conditioned in sequence prior to each zone being fractured in sequence). Method 220 may begin at step 222, which includes circulating a proppant-free hydraulic fracturing liquid into a wellbore and into fluid contact with a selected zone of a rock formation adjacent the wellbore. For example, the proppant-free hydraulic fracturing liquid may be, for instance, the first hydraulic fracturing liquid 114, and is circulated by the hydraulic fracturing liquid circulation system 112 into the working string 130. The proppant-free hydraulic fracturing liquid (e.g., a pad or pre-pad liquid) is circulated into a particular zone (e.g., zone 126) to contact the rock formation in the zone. In some aspects, the proppant-free hydraulic fracturing liquid may begin to initiate fractures in the rock formation in step 222.

Method 220 may continue at step 224, which includes fluidly isolating the selected zone of the rock formation. For example, the selected zone (e.g., zone 126) of the formation may be fluidly isolated (e.g., mechanically through plugs or packers, or otherwise) from other zones of the formation, as well as from other portions of the wellbore 104. In some aspects, the fluid isolation ensures that a fluid circulated to the selected zone is not circulated or leaked, whether through an annulus between the working string 130 and the casing 110 (or wellbore 104) or within the working string 130 itself.

Method 220 may continue at step 226, which includes fluidly contacting the selected zone of the rock formation with the proppant-free hydraulic fracturing liquid for a specified time duration. For example, in some aspects, the proppant-free hydraulic fracturing liquid may be isolated at the selected zone to condition, or soak, the rock formation in that zone for a specified time period (e.g., hours, days, weeks, months). In some aspects, the specified time duration may have been previously determined by testing of conditioning times (with that specific or similar proppant-free hydraulic fracturing liquid) for the particular rock formation, whether it be shale, sandstone, or otherwise. In some examples, the specified time duration is determined through testing of core samples of the rock formation to determine how much conditioning time is needed for a reduction of a particular amount or percentage of a mechanical strength (e.g., tensile strength) of the rock formation. In some examples, the specified time duration is determined through testing of core samples of the rock formation to determine how much conditioning time is needed for an increase of a particular amount or percentage of a permeability or porosity of the rock formation.

Method 220 may continue at step 228, which includes a determination of whether the specified time duration is completed. Once the specified time duration is completed, method 220 may continue to step 230. If the specified time duration is not completed, then the proppant-free hydraulic fracturing liquid continues to condition or fluidly contact the rock formation in the selected zone at step 218. In some aspects, the determination may be made by the control system 118.

Method 220 may continue at step 230, which includes a determination of whether there are additional zones in the rock formation (e.g., in which steps 222-228 have not been completed). For example, in some aspects, the method 220 may complete steps 222-228 for zone 126 (e.g., while that zone is isolated from other zones). If there are additional zones (e.g., zones 122, 124) for which steps 222-228 have not been completed, then method 220 moves to step 232. If steps 222-228 have been completed for all zones of the subterranean formation, then method 220 may continue at step 234.

Method 220 may continue at step 232, which includes selecting a next zone of the rock formation. For example, upon a determination that there are additional zones (or an additional zone) of the subterranean formation for which steps 222-228 have not been completed, then an untreated zone (e.g., zone 122 or zone 124) is selected. Method 220 then repeats steps 222-228 for the newly selected zone.

Method 220 may continue at step 234, which includes circulating a proppant-laden hydraulic fracturing liquid into the wellbore to fracture each of the selected zones of the rock formation. For example, in some aspects, the proppant-laden hydraulic fracturing liquid is the second hydraulic fracturing liquid 116, which may be sequentially circulated through the working string 130 by the hydraulic fracturing liquid circulation system 112 to each of the conditioned zones (e.g., zones for which steps 222-228 have been completed) in a specified or unspecified order. The proppant-laden hydraulic fracturing liquid (e.g., a seawater- or brine-based slickwater with proppant) is circulated into each of the selected zones (e.g., zones 122-126) to contact the rock formation in the zone and more fully fracture the formation, leaving proppant in the formed fractures.

Method 220 may continue at step 236, which includes which includes completing the hydraulic fracturing operation. For example, once all of the zones of the subterranean formation have been treated (e.g., conditioned and hydraulically fractured) according to steps 222-234, then the hydraulic fracturing job may be completed.

Method 240 of FIG. 2C, for example, describes an example hydraulic fracturing process in which each zone of multiple zones of a rock formation in a subterranean zone may be conditioned with a proppant-free hydraulic fracturing liquid and a proppant-laden hydraulic fracturing liquid and then fractured with one or more proppant-laden hydraulic fracturing liquids in a sequential order. For instance, a zone may be conditioned and then fractured (by the one or more proppant-laden hydraulic fracturing liquids) prior to the process moving to a next zone of multiple zones of the rock formation. Method 240 may begin at step 242, which includes circulating a proppant-free hydraulic fracturing liquid into a wellbore and into fluid contact with a selected zone of a rock formation adjacent the wellbore. For example, the proppant-free hydraulic fracturing liquid may be, for instance, the first hydraulic fracturing liquid 114, and is circulated by the hydraulic fracturing liquid circulation system 112 into the working string 130. The proppant-free hydraulic fracturing liquid (e.g., a pad or pre-pad liquid) is circulated into a particular zone (e.g., zone 126) to contact the rock formation in the zone. In some aspects, the proppant-free hydraulic fracturing liquid may begin to initiate fractures in the rock formation in step 242.

Method 240 may continue at step 244, which includes circulating a proppant-laden hydraulic fracturing liquid into the wellbore to fracture the selected zone of the rock formation. For example, in some aspects, the proppant-laden hydraulic fracturing liquid is the second hydraulic fracturing liquid 116, which may be circulated through the working string 130 by the hydraulic fracturing liquid circulation system 112. The proppant-laden hydraulic fracturing liquid (e.g., a seawater- or brine-based slickwater with proppant) is circulated into the selected zone (e.g., zone 126) to contact the rock formation in the zone and more fully fracture the formation, leaving proppant in the formed fractures.

Method 240 may continue at step 246, which includes fluidly isolating the selected zone of the rock formation. For example, the selected zone (e.g., zone 126) of the formation may be fluidly isolated (e.g., mechanically through plugs or packers, or otherwise) from other zones of the formation, as well as from other portions of the wellbore 104. In some aspects, the fluid isolation ensures that a fluid circulated to the selected zone is not circulated or leaked, whether through an annulus between the working string 130 and the casing 110 (or wellbore 104) or within the working string 130 itself.

Method 240 may continue at step 248, which includes fluidly contacting the selected zone of the rock formation with the proppant-laden hydraulic fracturing liquid for a specified time duration. For example, in some aspects, the proppant-laden hydraulic fracturing liquid may be isolated at the selected zone to condition, or soak, the rock formation in that zone for a specified time period (e.g., hours, days, weeks, months). In some aspects, the specified time duration may have been previously determined by testing of conditioning times for the particular rock formation, whether it be shale, sandstone, or otherwise. In some examples, the specified time duration is determined through testing of core samples of the rock formation to determine how much conditioning time (with that specific or similar proppant-laden hydraulic fracturing liquid) is needed for a reduction of a particular amount or percentage of a mechanical strength (e.g., tensile strength) of the rock formation. In some examples, the specified time duration is determined through testing of core samples of the rock formation to determine how much conditioning time is needed for an increase of a particular amount or percentage of a permeability or porosity of the rock formation.

Method 240 may continue at step 250, which includes which includes a determination of whether the specified time duration is completed. Once the specified time duration is completed, method 240 may continue to step 252. If the specified time duration is not completed, then the proppant-laden hydraulic fracturing liquid continues to condition or fluidly contact the rock formation in the selected zone at step 248. In some aspects, the determination may be made by the control system 118.

Method 240 may continue at step 252, which includes circulating another proppant-laden hydraulic fracturing liquid into the wellbore to fracture the selected zone of the rock formation. For example, in some aspects, the proppant-laden hydraulic fracturing liquid that was circulated in step 244 may also be circulated into the working string 130 by the hydraulic fracturing liquid circulation system 112 to further fracture the selected zone (e.g., zone 126) of the rock formation, also leaving behind proppant within the generated fractures. In alternative aspects, a different proppant-laden hydraulic fracturing liquid (e.g., different chemical make-up, different circulating pressure, or different circulating time) may be circulated in step 252 as compared to step 244.

Method 240 may continue at step 254, which includes which includes a determination of whether there are additional zones in the rock formation (e.g., in which steps 242-238 have not been completed). For example, in some aspects, the method 240 may complete steps 242-252 for zone 126 (e.g., while that zone is isolated from other zones). If there are additional zones (e.g., zones 122, 124) for which steps 242-252 have not been completed, then method 240 moves to step 256. If steps 242-252 have been completed for all zones of the subterranean formation, then method 240 may continue at step 258.

Method 240 may continue at step 256, which includes selecting a next zone of the rock formation. For example, upon a determination that there are additional zones (or an additional zone) of the subterranean formation for which steps 242-252 have not been completed, then an untreated zone (e.g., zone 122 or zone 124) is selected. Method 240 then repeats steps 242-252 for the newly selected zone.

Method 240 may continue at step 258, which includes which includes which includes completing the hydraulic fracturing operation. For example, once all of the zones of the subterranean formation have been treated (e.g., conditioned and hydraulically fractured) according to steps 242-256, then the hydraulic fracturing job may be completed.

Figure 3A:
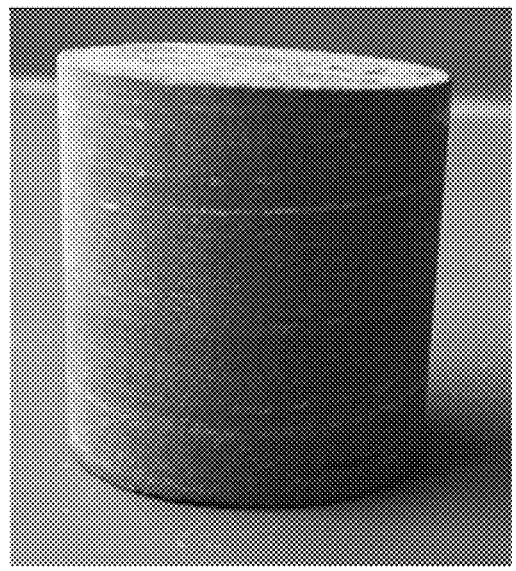
FIG. 3A-3B are photographs of core samples of a geologic formation that were tested as part of an experimental process that included conditioning the core samples according to the present disclosure.
Figure 3B:
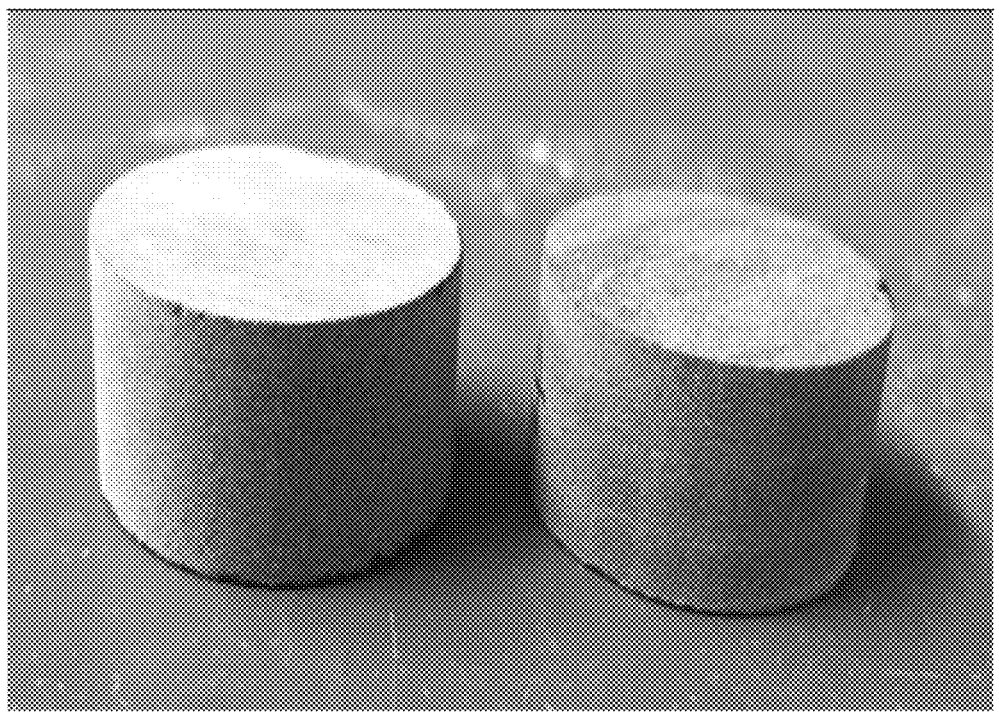

FIG. 3A-3B are photographs of core samples of a geologic formation that were tested as part of an experimental process that included conditioning the core samples. For example, as described previously, one or more of the steps of methods 200, 220, and 240 may include or depend on testing results of rock samples to determine, e.g., a time duration in which sample mechanical strength, porosity, and/or permeability is affected by conditioning the sample with a particular hydraulic fracturing liquid (e.g., proppant-free or proppant-laden). The step of conditioning a rock formation, or zone of a rock formation, by providing for a specified time duration of fluid contact between the hydraulic fracturing liquid and the rock formation may follow theoretically from the following equation:

$$P_{bd} = T_0 - S_{hMax} + 3S_{hMin} - \alpha P_P \quad \text{Eq. 1.}$$

where $P_{bd}$ is the breakdown pressure, $T_0$ is the tensile strength of the rock formation, $S_{hMax}$ is the horizontal maximum pressure in the far field, $S_{hMin}$ is the horizontal minimum pressure in the far field, $\alpha$ is the poroelastic coefficient, and $P_p$ is the pore pressure of the rock formation.

Since parameters such as $S_{hMax}$, $S_{hMin}$, and $P_p$ are intrinsic properties of the rock formation, the only parameter which could be reduced is the $T_0$, which is the tensile strength of the rock formation, in order to reduce the formation breakdown pressure, $P_{bd}$. By reducing the breakdown pressure, the rock formation may be more easily and efficiently fractured through a hydraulic fracturing operation. To that end, Brazilian tensile strength experiments were performed on nineteen pairs of Eagle Ford shale rock samples. In order to compare the tensile strength of the pairs of samples before and after conditioning (e.g., fluidly contacting the rock sample for a specified time duration with a hydraulic fracturing liquid), twin samples were used to minimize the intrinsic heterogeneity of the shale itself. A sample with 1-inch diameter and 1-inch long was cut into two sub-samples with identical lengths. FIG. 3A shows an Eagle Ford shale whole sample, while FIG. 3B shows the sample cut into twin samples. The twin samples were split into "A" test samples and "B" test samples.

Figure 4:
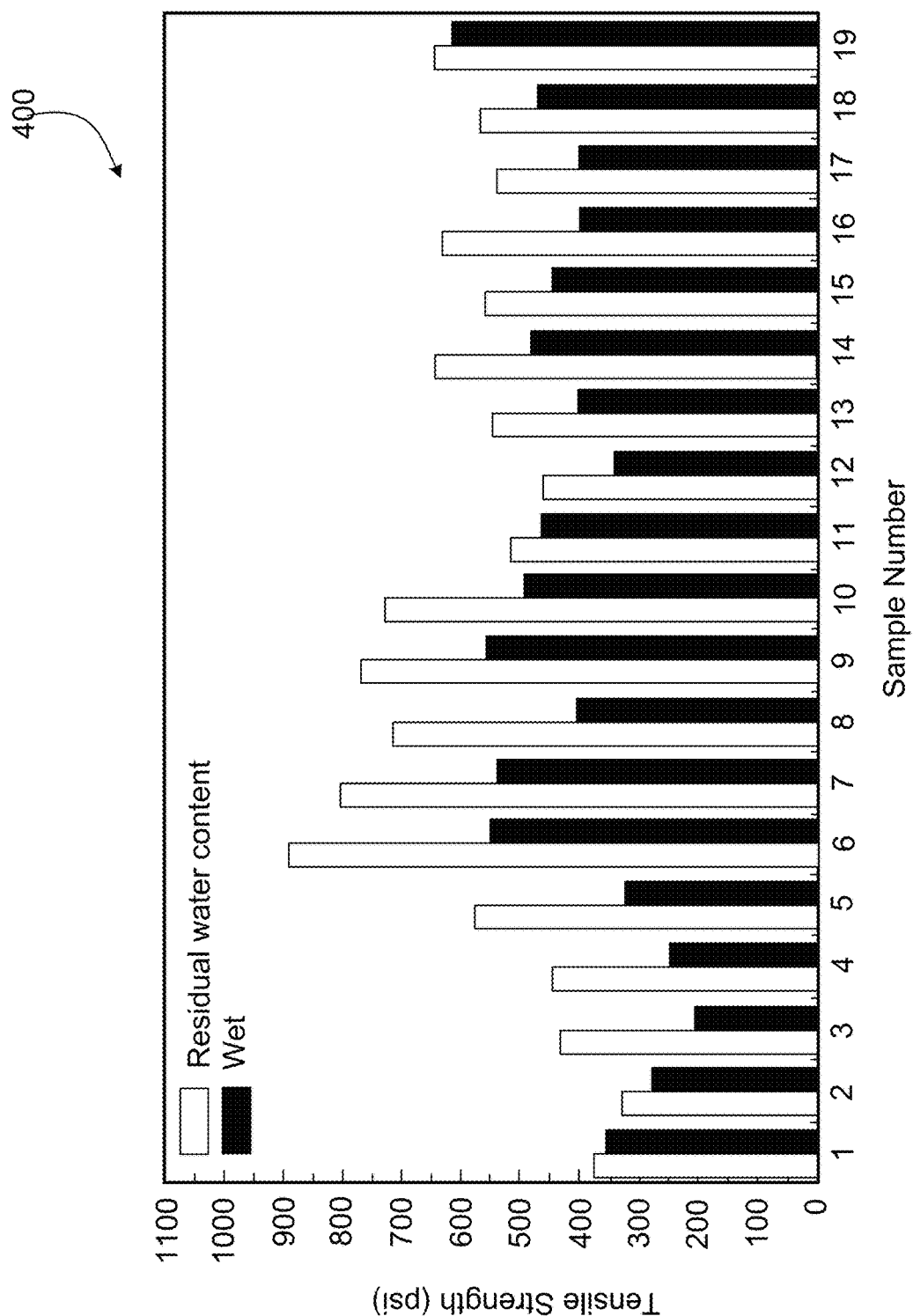
FIG. 4 is a chart showing results of testing of core samples of the geologic formation as part of the experimental process that included conditioning the core samples according to the present disclosure.

FIG. 4 is a chart showing results of testing of core samples of the geologic formation as part of the experimental process that included conditioning the core samples. For the experiment, the A samples were Brazilian tested without prior conditioning (e.g., tested under residual water content conditions) while the B samples were conditioned in a hydraulic fracturing liquid for 48 hours. Tensile strengths of the nineteen A and B samples were then determined through the Brazilian testing. Chart 400 shows the results of these tests on the A samples (labeled "residual water content") and B samples (labeled "wet"). As shown in chart 400, the imbibed hydraulic fracturing liquid reduced measured tensile strength for all tested B samples relative to their counterpart A samples. Tensile strength decrease for this experiment ranges from 4.4% to 51.7%, as water content within the B samples (relative to the A samples) increased in a range from 4.4% to 11.7%.

Figure 5A:
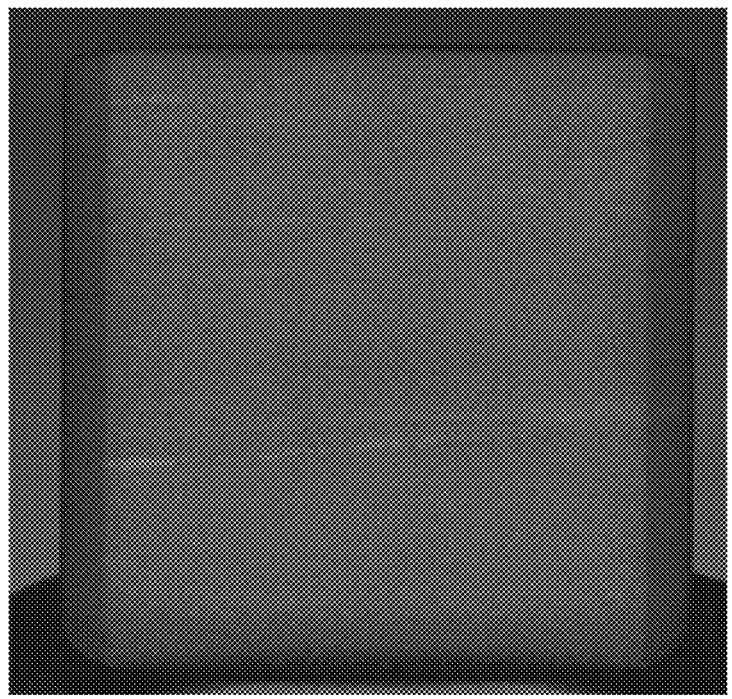
FIGS. 5A-5B show computed tomography (CT) images taken from a core sample of the geologic formation as part of the experimental process that included conditioning the core samples according to the present disclosure.
Figure 5B:
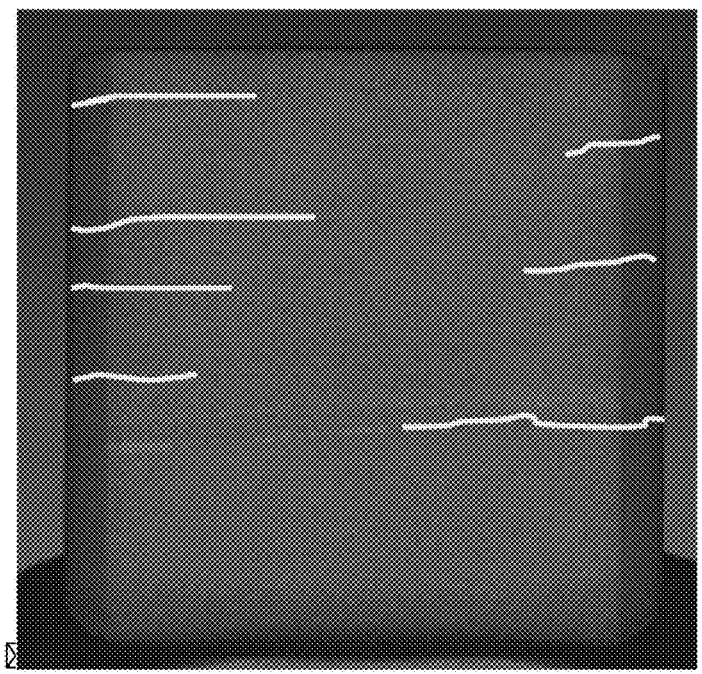

FIGS. 5A-5B show computed tomography (CT) images taken from a core sample of the geologic formation as part of the experimental process that included conditioning the core samples. Continuing the process explained above with reference to FIG. 4, the nineteen B samples were observed under a CT image scan, prior to and after the conditioning. FIG. 5A shows a CT scan of a particular one of the B samples prior to conditioning. As shown, there are no or negligible fractures present in the sample prior to the conditioning in the hydraulic fracturing liquid. FIG. 5B shows a CT scan of the particular B sample subsequent to the 48 hour conditioning in the hydraulic fracturing liquid. As shown, a fair amount of hair-like fractures inside the sample is observed after conditioning in the hydraulic fracturing fluid, e.g., due to potential shrinkage of clay or dissolution of minerals.

Figure 6A:
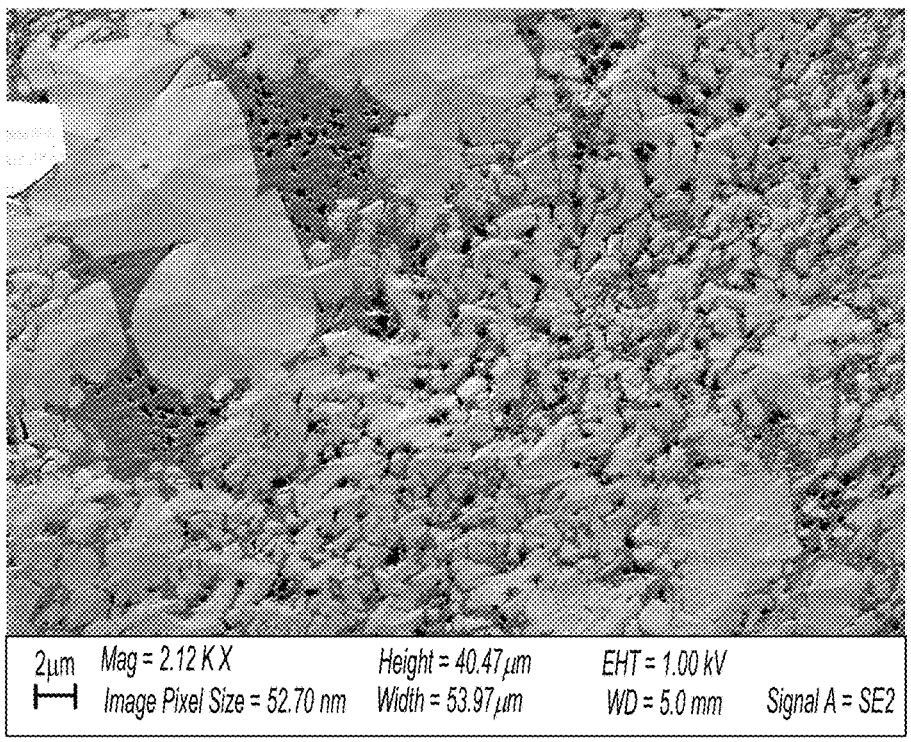
FIGS. 6A-6D show scanning electron microscope (SEM) images taken from at least one core sample of the geologic formation as part of the experimental process that included conditioning the core samples according to the present disclosure.
Figure 6B:
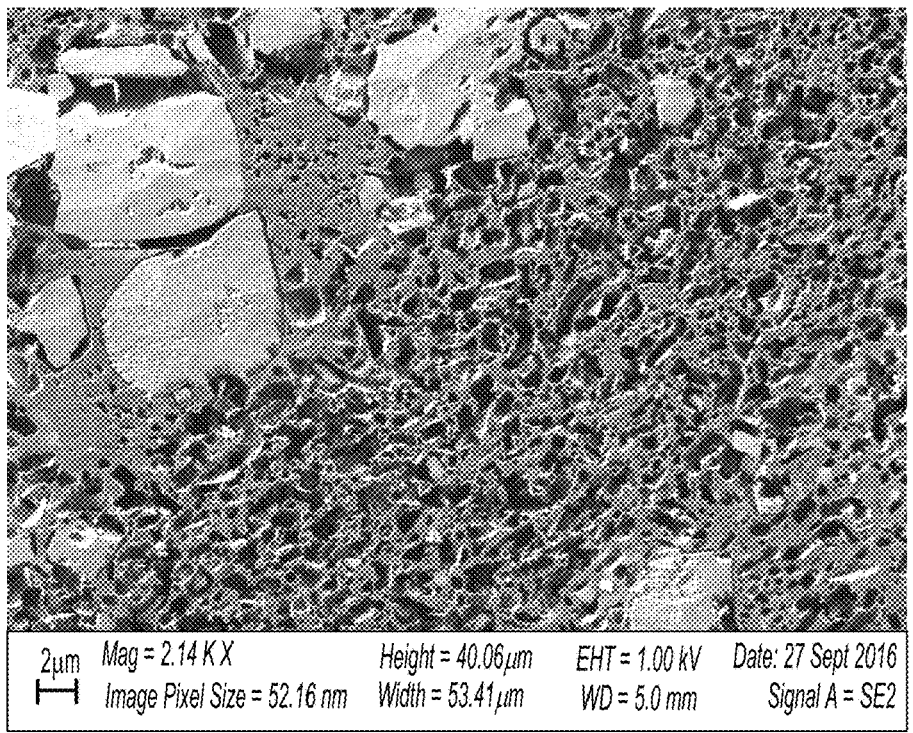
Figure 6C:
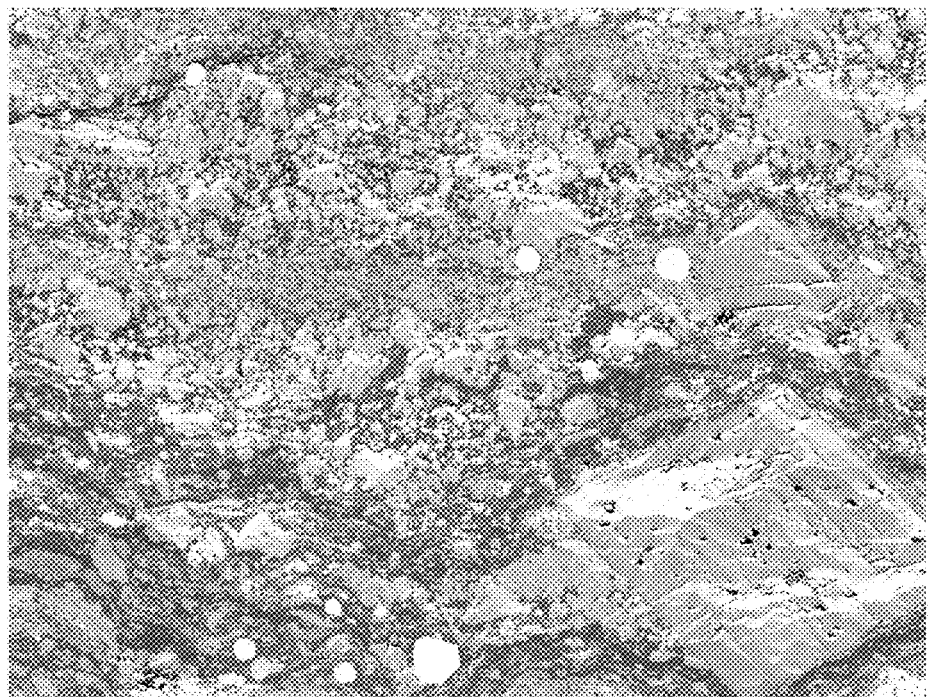
Figure 6D:
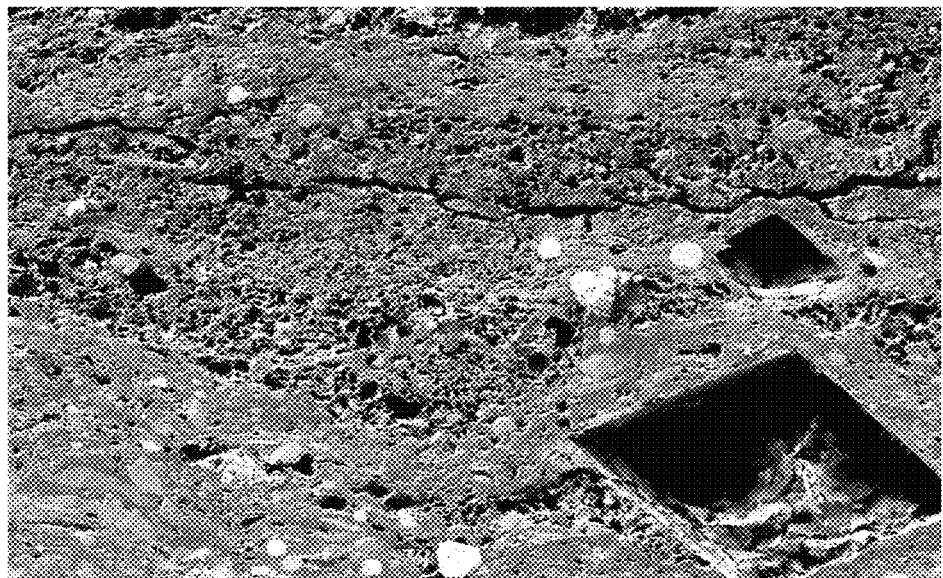

FIGS. 6A-6D show scanning electron microscope (SEM) images taken from at least one core sample of the geologic formation as part of the experimental process that included conditioning the core samples. For example, continuing and for the purpose of the experimental procedure described for the nineteen pairs of A and B samples, SEM image tests on thin sections of particular B samples were taken prior to and after the conditioning. The thin sections shown in FIGS. 6A and 6C are pre-conditioning images taken of two particular B samples. The thin sections shown in FIGS. 6B and 6D are post-conditioning images taken of the two particular B samples. As shown in FIGS. 6B and 6D, these SEM images illustrate that minerals (such as calcite) were dissolved in the hydraulic fracturing fluid during the conditioning time duration. Further, these SEM images illustrate that significant fractures and voids were created by the conditioning of the samples in the hydraulic fracturing liquid.

FIG. 7 shows a table 700 that includes porosity and permeability data of at least one core sample of the geologic formation as part of the experimental process that included conditioning the core samples. For example, continuing the experimental procedure described for the nineteen pairs of A and B samples, and in order to investigate the conditioning process impact on matrix permeability, permeability tests were conducted on three B samples before and after conditioning. The porosity and the permeability before and after conditioning are shown in table 700. Table 700 includes a column 702 that includes the sample names (e.g., EF 162-EF 164), and a column 704 that indicates the confining pressure (in psi) to which the samples were subjected during the tests. Columns 706 and 708 show the testing results of each of the three samples (at each confining pressure) for porosity (as a percentage) and permeability, $K_{air}$ (in millidarcys, md), respectively, prior to conditioning. Columns 710 and 712 show the testing results of each of the three samples (at each confining pressure) for porosity and permeability, $K_{air}$, respectively, subsequent to conditioning. As can be seen in table 700 in columns 710 and 712 (relative to the results in columns 706 and 708), the porosity of all three samples increased (from the pre-conditioning test results to the post-conditioning test results) by 1-2%. The permeability of all three samples increased (from the pre-conditioning test results to the post-conditioning test results) significantly by 10-60 times.

The described testing results indicate, for example, that adding a conditioning step (e.g., to fluidly contact the rock formation with a hydraulic fracturing liquid for a specified time duration) in the conventional hydraulic fracturing process may include: weakening of mechanical properties of a rock formation by the conditioning to a certain extent after exposure to the hydraulic fracturing liquid or liquids; tensile strength of a rock formation that has been conditioned according to the present disclosure may be lower than a similar, unconditioned rock formation; a more complex fracturing network which may or may not be propped open by proppant to increase the connections and surface area between the hydraulic fractures and rock matrix, may be generated based at least in part on the conditioning process according to the present disclosure; matrix permeability of a rock formation that has been conditioned according to the present disclosure may increase, relative to a similar, unconditioned rock formation, based at least in part on the conditioning.

Figure 8:
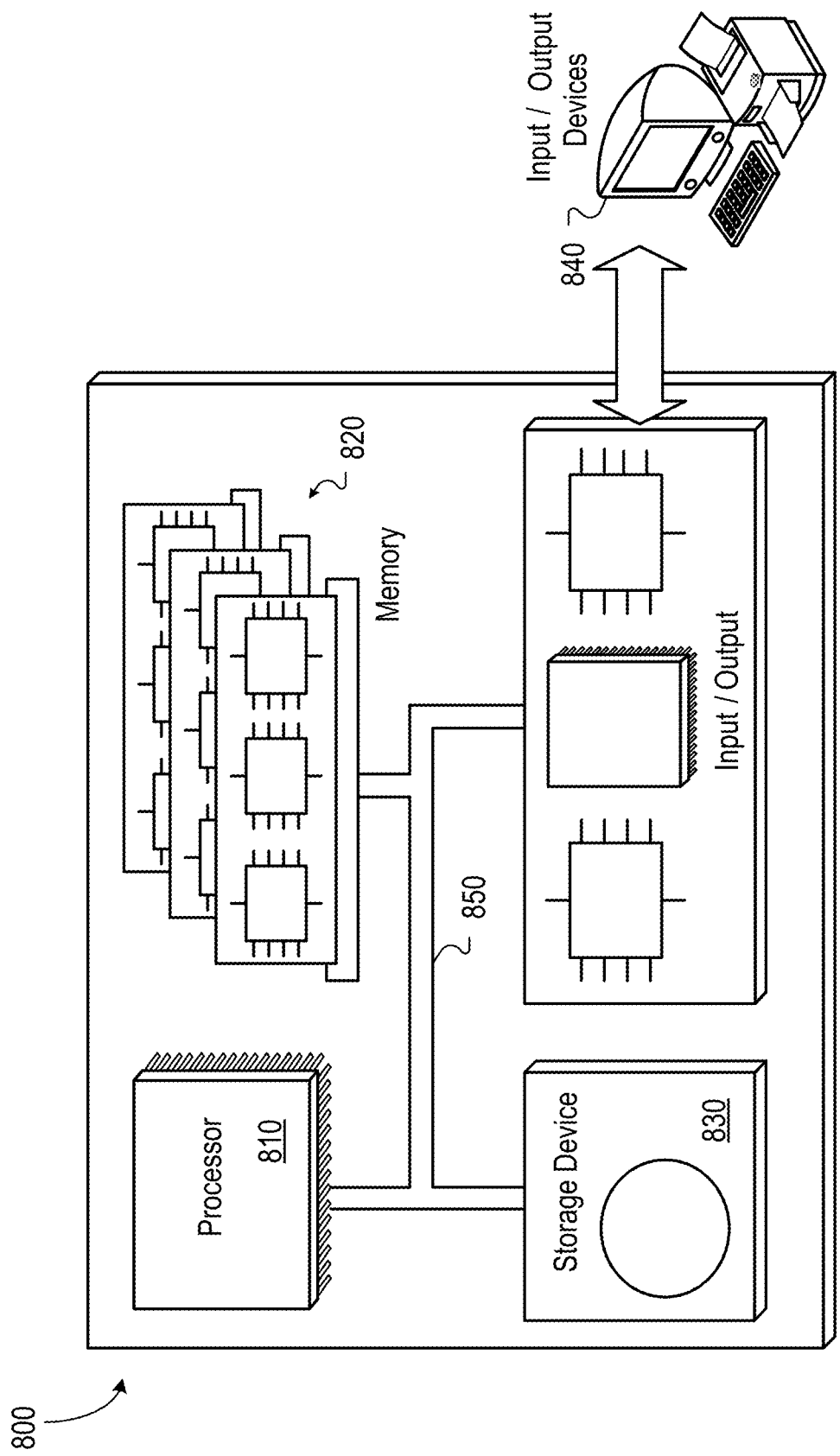
FIG. 8 is a schematic illustration of an example controller for a hydraulic fracturing system according to the present disclosure.

FIG. 8 is a schematic illustration of an example controller 800 (or control system) for a hydraulic fracturing system, such as the hydraulic fracturing system 100. For example, the controller 800 may be the control system 118 shown in FIG. 1. The controller 800 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 800 includes a processor 810, a memory 820, a storage device 830, and an input/output device 840. Each of the components 810, 820, 830, and 840 are interconnected using a system bus. The processor 810 is capable of processing instructions for execution within the controller 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the controller 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the controller 800. In one implementation, the storage device 830 is a computer-readable medium. In various different implementations, the storage device 830 may be a floppy disk device, a hard disk device, an optical disk device, or a tape device.

The input/output device 840 provides input/output operations for the controller 800. In one implementation, the input/output device 840 includes a keyboard and/or pointing device. In another implementation, the input/output device 840 includes a display unit for displaying graphical user interfaces.

One or more features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for hydraulically fracturing a geologic formation, comprising:
 circulating a proppant-free hydraulic fracturing liquid into a wellbore that is formed from a terranean surface into a geologic formation within a subterranean zone that is adjacent the wellbore;
 fluidly contacting the geologic formation with the proppant-free hydraulic fracturing liquid for a specified duration of time that is calculated to reduce a tensile strength of the geologic formation by a specified percentage or amount based on testing of at least one core sample of the geologic formation with the proppant-free hydraulic fracturing liquid;
 shutting in the wellbore during the specified duration of time;
 reducing the tensile strength of the geologic formation the specified percentage or amount based on the fluid contact of the geologic formation with the proppant-free hydraulic fracturing liquid for the specified duration of time;
 subsequent to the specified duration of time, circulating a hydraulic fracturing liquid that comprises proppant into the wellbore to fracture the geologic formation based on a pressure of the circulated hydraulic fracturing liquid.

2. The method of claim 1, wherein the specific duration of time is between about three hours and one month.

3. The method of claim 1, wherein the specified duration of time is further calculated to increase at least one of a porosity or a permeability of the geologic formation by a specified percentage or amount based on testing of the at least one core sample of the geologic formation with the proppant-free hydraulic fracturing liquid, the method further comprising:
 increasing the at least one of the porosity or permeability of the geologic formation the specified percentage or amount based on the fluid contact of the geologic formation with the proppant-free hydraulic fracturing liquid for the specified duration of time.

4. The method of claim 1, wherein circulating the proppant-free hydraulic fracturing liquid into the wellbore comprises, prior to the specified duration of time:
 circulating, in a first stage, a first portion of the proppant-free hydraulic fracturing liquid into the wellbore to a first portion of the geologic formation; and
 circulating, in a second stage, a second portion of the proppant-free hydraulic fracturing liquid into the wellbore to a second portion of the geologic formation that is different than the first portion.

5. The method of claim 4, wherein fluidly contacting the geologic formation with the proppant-free hydraulic fracturing liquid for the specified duration of time comprises:
 fluidly contacting the first and second portions of the geologic formation with the first and second portions of the proppant-free hydraulic fracturing liquid simultaneously for the specified duration of time.

6. The method of claim 1, wherein circulating the proppant-free hydraulic fracturing liquid comprises circulating a first portion of the proppant-free hydraulic fracturing liquid, and fluidly contacting the geologic formation with the proppant-free hydraulic fracturing liquid for the specified duration of time comprises fluidly contacting a first portion of the geologic formation with the first portion of the proppant-free hydraulic fracturing liquid for a first specified duration of time, the method comprising:
 subsequent to the first specified duration of time:
  circulating a first portion of the hydraulic fracturing liquid that comprises proppant into the wellbore to fracture the first portion of the geologic formation;
  circulating a second portion of the proppant-free hydraulic fracturing liquid into the wellbore; and
  fluidly contacting a second portion of the geologic formation with the second portion of the proppant-free hydraulic fracturing liquid for a second specified duration of time; and
 subsequent to the second specified duration of time, circulating a second portion of the hydraulic fracturing liquid that comprises proppant into the wellbore to fracture the second portion of the geologic formation.

7. The method of claim 1, wherein circulating the hydraulic fracturing liquid that comprises proppant into the wellbore to fracture the geologic formation comprises circulating a secondary portion of the hydraulic fracturing liquid that comprises proppant into the wellbore to further fracture the geologic formation, the method further comprising:
 prior to the specified duration of time, circulating a primary portion of the hydraulic fracturing liquid that comprises proppant into the wellbore to initially fracture the geologic formation.

8. The method of claim 1, further comprising, based on the fluid contact of the geologic formation with the proppant-free hydraulic fracturing liquid for the specified duration of time, initiating one or more hydraulic fractures in the geologic formation with the proppant-free hydraulic fracturing liquid.

9. The method of claim 1, wherein the proppant-free hydraulic fracturing liquid comprises a slickwater hydraulic fracturing liquid.

10. A method, comprising:
(i) circulating a pad fluid into a wellbore to contact a rock formation in a subterranean zone adjacent the wellbore and subsequently performing a well shut-in of the wellbore;
(ii) conditioning the rock formation with the pad fluid during the well shut-in and for a time duration sufficient to reduce a tensile strength of the rock formation a specified amount or percentage based on contact between the pad liquid and the rock formation for the time duration, the time duration calculated to reduce the tensile strength of the rock formation by the specified amount or percentage based on testing of at least one core sample of the rock formation with the pad fluid; and
(iii) circulating a hydraulic fracturing liquid that comprises proppant into the wellbore to fracture the rock formation based on a pressure of the hydraulic fracturing liquid.

11. The method of claim 10, wherein the time duration is calculated to increase at least one of a porosity or a permeability of the rock formation by a specified amount or percentage based on testing of the at least one core sample of the rock formation with the pad fluid, the method further comprising:
increasing the at least one of the porosity or permeability of the rock formation the specified amount or percentage based on contact between the pad liquid and the rock formation for the time duration.

12. The method of claim 10, wherein the pad liquid comprises a slickwater liquid.

13. The method of claim 12, wherein the slickwater comprises a water- or brine-based acrylamide methyl propane sulfonate (AMPS) polyacrylamide liquid.

14. The method of claim 10, wherein step (iii) proceeds subsequent to the time duration.

15. The method of claim 14, further comprising sequentially repeating steps (i) through (iii) for each stage of a multi-stage fracturing operation.

16. The method of claim 14, further comprising:
(iv) sequentially repeating steps (i) and (ii) for each stage of a multi-stage fracturing operation; and
(v) subsequent to step (iv), repeating step (iii) for each stage of the multi-stage fracturing operation.

17. A method, comprising:
(i) circulating a pad liquid into a wellbore to contact a rock formation in a subterranean zone adjacent the wellbore;
(ii) circulating a hydraulic fracturing liquid that comprises proppant into the wellbore to fracture the rock formation;
(iii) shutting in the wellbore for a time duration sufficient to reduce a tensile strength of the rock formation a specified amount or percentage based on contact between the rock formation and the pad liquid for the time duration, the time duration calculated to reduce the tensile strength of the rock formation by the specified amount or percentage based on testing of at least one core sample of the rock formation with the pad liquid; and
(iv) subsequent to the time duration, circulating the hydraulic fracturing liquid that comprises proppant into the wellbore to further fracture the rock formation.

18. The method of claim 17, further comprising sequentially repeating steps (i) through (iv) for each stage of a multi-stage fracturing operation.

19. The method of claim 18, wherein the pad liquid comprises a slickwater liquid.

20. The method of claim 19, wherein the slickwater comprises a water- or brine-based acrylamide methyl propane sulfonate (AMPS) polyacrylamide liquid.

* * * * *